United States Patent
Xu

(10) Patent No.: US 10,149,152 B2
(45) Date of Patent: Dec. 4, 2018

(54) METHOD AND APPARATUS FOR RECOGNIZING SERVICE REQUEST TO CHANGE MOBILE PHONE NUMBER

(71) Applicant: ALIBABA GROUP HOLDING LIMITED, Grand Cayman (KY)

(72) Inventor: Dian Xu, Hangzhou (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 0 days.

(21) Appl. No.: 16/005,404

(22) Filed: Jun. 11, 2018

(65) Prior Publication Data

US 2018/0295504 A1    Oct. 11, 2018

Related U.S. Application Data

(63) Continuation of application No. PCT/CN2016/108626, filed on Dec. 6, 2016.

(30) Foreign Application Priority Data

Dec. 14, 2015    (CN) .......................... 2015 1 0927308

(51) Int. Cl.
| | |
|---|---|
| *H04M 1/66* | (2006.01) |
| *H04W 8/26* | (2009.01) |
| *H04W 12/12* | (2009.01) |
| *H04W 8/24* | (2009.01) |
| *H04W 8/18* | (2009.01) |

(52) U.S. Cl.
CPC .............. *H04W 8/26* (2013.01); *H04W 8/18* (2013.01); *H04W 8/24* (2013.01); *H04W 12/12* (2013.01)

(58) Field of Classification Search
None
See application file for complete search history.

(56) References Cited

U.S. PATENT DOCUMENTS

2009/0052415 A1* 2/2009 Ishii .................. H04W 40/20
370/338

FOREIGN PATENT DOCUMENTS

| CN | 102325062 A | 1/2012 |
| CN | 103593376 A | 2/2014 |
| CN | 104469768 A | 3/2015 |
| CN | 104516918 A | 4/2015 |
| CN | 104580091 A | 4/2015 |
| CN | 104902033 A | 9/2015 |

OTHER PUBLICATIONS

International Search Report and Written Opinion for Application No. PCT/CN2016/108626, dated Feb. 28, 2017, 9 pages.

* cited by examiner

*Primary Examiner* — Suhail Khan

(57) ABSTRACT

Methods and devices for recognizing a request to change a mobile phone number are disclosed. The exemplary method comprises: when a request to change a mobile phone number sent by a user is received, obtaining corresponding historical transaction record information from a storage unit according to user identification information carried in the request; matching current environment information carried in the request with historical environment information carried in the historical transaction record information; if the current environment information matches the historical environment information, recognizing the request as a trusted request, and executing a service operation to change the mobile phone number.

20 Claims, 4 Drawing Sheets

METHOD AND APPARATUS FOR RECOGNIZING SERVICE REQUEST TO CHANGE MOBILE PHONE NUMBER

CROSS REFERENCE TO RELATED APPLICATIONS

The present application is a continuation application of International Patent Application No. PCT/CN2016/108626, filed on Dec. 6, 2016, which claims priority to Chinese Patent Application No. 201510927308.5, filed on Dec. 14, 2015 and entitled "Method and Apparatus for Recognizing Service Request to Change Mobile Phone Number," which is incorporated herein by reference in its entirety.

TECHNICAL FIELD

The present application relates to the field of computer technologies, and in particular, to methods and apparatuses for recognizing a service request to change a mobile phone number.

BACKGROUND

In existing technologies, when recognizing whether a service request to change a mobile phone number is genuine, it is often necessary to go through several times of interaction with a user. For example, the user is required to input user information, such as a text message verification code, an I.D. number, an email address, or a security question. The service request is identified to be a trusted service request only after the user information input by the user passes verification, and then a service operation to change the mobile phone number is executed. However, the above identification method usually requires a user to memorize different user information, and the verification flow is relatively cumbersome, which leads to a relatively poor user experience. In addition, multiple interactions with the user could affect the efficiency of recognizing a service request to change a mobile phone number.

SUMMARY

The present disclosure provides a method and a device for recognizing a request to change a mobile phone number, which can improve the user experience and the efficiency of recognizing a request to change a mobile phone number.

According to one aspect, a method for recognizing a request to change a mobile phone number is provided, comprising: receiving a request to change a mobile phone number sent by a first user, the request carrying identification information of the first user and current environment information; obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information; determining whether the current environment information of the first user matches the historical environment information in the at least one piece of historical transaction record information; and if the current environment information matches the historical environment information, recognizing the request as a trusted request, and executing a service operation to change the mobile phone number.

In some embodiments, the environment information comprises one or more types of the following information: Internet Protocol (IP) address information of the user, Medium Access Control (MAC) address information of the user, user equipment-related information, and operating system information of the user. In one example, the user equipment comprises a fixed terminal; and the user equipment-related information comprises one or more of the following: browser type information, browser version information, and MAC address identifier information (umid). In another example, the user equipment comprises a mobile terminal; and the user equipment-related information comprises one or more of the following: International Mobile Equipment Identification Number (IMEI) information and International Mobile Subscriber Identification Number (IMSI) information.

According to another aspect, a device for recognizing a request to change a mobile phone number is provided, comprising: a receiving unit, a obtaining unit, a determining unit, and an executing unit; the receiving unit is configured to receive a request to change a mobile phone number sent by a first user, the request carrying identification information of the first user and current environment information; the obtaining unit is configured to obtain at least one piece of corresponding historical transaction record information from a storage unit according to the identification information of the first user received by the receiving unit, wherein the storage unit is configured to record one or more pieces of the historical transaction record information of at least one user with service type information meeting a preset condition, and the historical transaction record information comprises historical environment information; the determining unit is configured to determine whether the current environment information of the first user matches the historical environment information in the at least one piece of historical transaction record information obtained by the obtaining unit; and the executing unit is configured to, if the current environment information matches the historical environment information, identify the request as a trusted request, and execute a service operation to change the mobile phone number.

According to another aspect, a non-transitory computer-readable storage medium may store instructions that, when executed by a processor, cause the processor to perform a method for recognizing a request to change a mobile phone number. The method comprises: receiving a request to change a mobile phone number sent by a first user, the request carrying identification information of the first user and current environment information; obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information; determining whether the current environment information of the first user matches the historical environment information in the at least one piece of historical transaction record information; and if the current environment information matches the historical environment information, recognizing the request as a trusted request, and executing a service operation to change the mobile phone number.

According to another aspect, a system for recognizing a request to change a mobile phone number is disclosed. The system comprises a processor and a non-transitory computer-readable storage medium storing instructions that, when executed by the processor, cause the system to perform a method for recognizing a request to change a mobile phone number. The method may comprise: receiving a request to change a mobile phone number sent by a first user, the request carrying identification information of the first user and current environment information; obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information; determining whether the current environment information of the first user matches the historical environment information in the at least one piece of historical transaction record information; and if the current environment information matches the historical environment information, recognizing the request as a trusted request, and executing a service operation to change the mobile phone number.

With the disclosed method and the device for recognizing a request to change a mobile phone number, when a request to change a mobile phone number sent by a user is received, corresponding historical transaction record information is obtained from a storage unit according to user identification information carried in the request, and current environment information carried in the request is matched with historical environment information carried in the historical transaction record information. If the current environment information matches the historical environment information, the request is identified as a trusted request, and a service operation to change the mobile phone number is executed. Therefore, no interaction with the user is needed when recognizing a request to change a mobile phone number. Instead, historical transaction record information is obtained from a storage unit, and when current environment information carried in the request matches historical environment information carried in the historical transaction record information, the request is identified as a trusted service. As such, the user experience is improved, and the efficiency of recognizing a request to change a mobile phone number is improved.

BRIEF DESCRIPTION OF THE DRAWINGS

To more clearly describe technical solutions, the accompanying drawings will be described briefly below. Apparently, the accompanying drawings described below are merely exemplary. A person skilled in the art can further obtain other drawings according to these drawings without inventive effort.

DETAILED DESCRIPTION

Technical solutions of the present disclosure will be clearly and completely described below with reference to the accompanying drawings. Apparently, the embodiments described are some, rather than all, of embodiments of the present disclosure. All other embodiments obtainable by a person skilled in the art on the basis of the embodiments in the present disclosure shall fall within the scope of the present disclosure.

The method and the device for recognizing a request (e.g., service request) to change a mobile phone number provided by embodiments of the present disclosure are applicable to scenarios where whether a request to change a mobile phone number is trusted is identified in an Internet system. For example, a request to change a mobile phone number in a payment system is identified.

Figure 1:
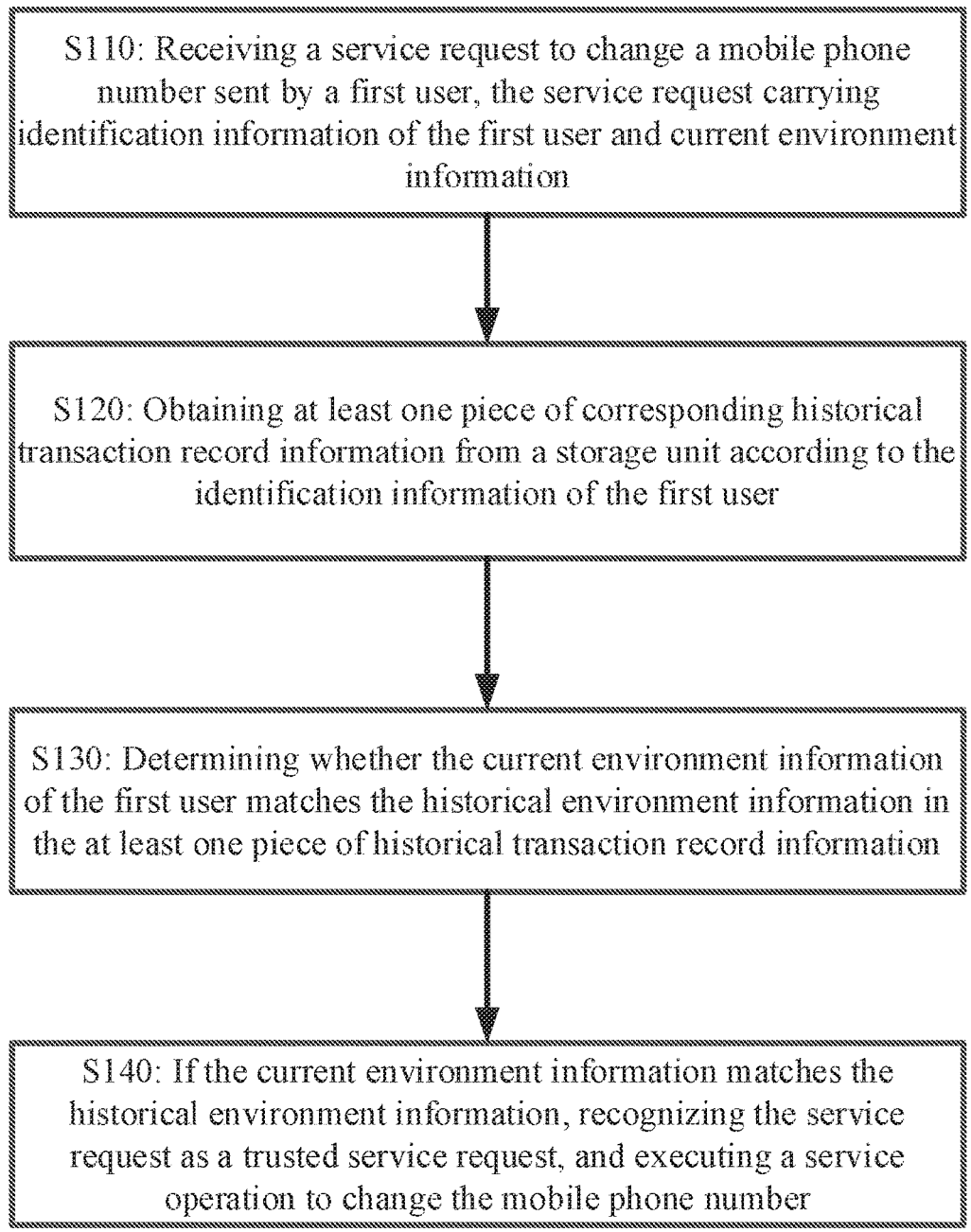
FIG. 1 is a flow chart of a method for recognizing a request to change a mobile phone number according to some embodiments of the present disclosure.

FIG. 1 is a flow chart of a method for recognizing a request to change a mobile phone number according to some embodiments of the present disclosure. A party that implements the method may comprise an apparatus with a processing capability, e.g., a server, a system, or a device. As shown in FIG. 1, the method can comprise:

Step 110, receiving a service request to change a mobile phone number sent by a first user, the service request carrying identification information of the first user and current environment information.

The current environment information herein can comprise one or more types of the following information: Internet Protocol (IP) address information of the user, Medium Access Control (MAC) address information of the user, user equipment-related information, and operating system information of the user. In some embodiments, when the equipment is a fixed terminal, the equipment-related information can comprise one or more of the follow types: browser type (e.g., IE, chrome, safari) information, browser version information, and MAC address identifier information (umid). When the equipment is a mobile terminal (e.g., various smart phones), the equipment-related information can comprise one or more of the follow types: International Mobile Equipment Identification Number (IMEI) information, International Mobile Subscriber Identification Number (IMSI) information, and the like. In addition, the operating system information can comprise operating system type and version information, such as IOS (6, 7.2, 8+), Android (2.3, 3, 4.2, 4.4.4, 5+) or Windows Phone.

For example, assuming that the identification information of the first user carried in the service request to change a mobile phone number is "0001," the current environment information comprises the following four types of information: IP address information, MAC address information, browser version information, and operating system version information, and these four types of information are "192.168.1.6," "00-01-6C-06-A6-29," "IE7.0," and "IOS8.0," respectively.

Step 120, obtaining at least one piece of corresponding historical transaction record information from a storage unit according to the identification information of the first user, wherein the storage unit is configured to record one or more pieces of historical transaction record information of at least one user with service type information meeting a preset condition, and the historical transaction record information comprises historical environment information.

Figure 2:
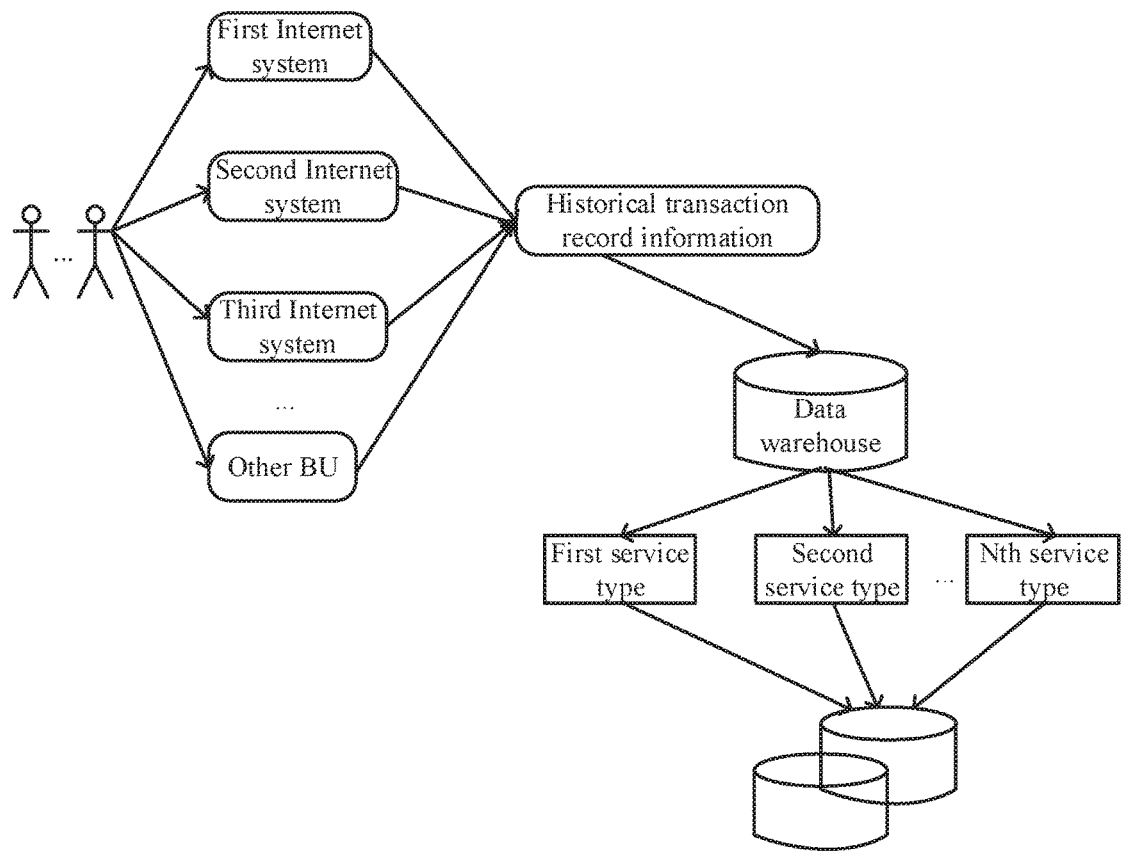
FIG. 2 is a schematic diagram of creating a storage unit according to some embodiments of the present disclosure.

Optionally, a method of creating a storage unit is shown in FIG. 2. According to FIG. 2, the steps of creating a storage unit comprise the follows:

Step 1201, collecting multiple pieces of historical transaction record information of at least one user in advance, wherein the historical transaction record information comprises service type information.

In FIG. 2, a server can collect multiple pieces of historical transaction record information of at least one user in advance from backend databases of multiple Internet systems (e.g., an Alipay system, a TaoBao system, a Tmall system, and the like). In some embodiments, the historical transaction record information of a user can be recorded by a server when the user conducts transaction operations in an Internet system during a preset historical time period. In one example, the collected multiple pieces of historical transaction record information of at least one user can be recorded in a data warehouse. In some embodiments, the historical transaction record information of the user recorded in the data warehouse has not been processed, and therefore is unstructured.

With a service request to change a mobile phone number in an Alipay system as an example, the service type information in FIG. 2 can comprise one or more of the following: mobile phone credit refill records, mobile phone records for shipping addresses, records of mobile phone numbers bundled to TaoBao accounts, and terminal log-in records.

In some embodiments, the multiple pieces of historical transaction record information of at least one user in the data warehouse above can be updated in a T+1 manner. Here, T can be 1 day, 1 hour, or the like. For example, if T is 1 day and the server collects historical transaction record information of a user on May 5, 2015, then the server will update the historical transaction record information of the user into the data warehouse on May 6, 2015.

Step 1202, for any of the at least one user, selecting, from multiple pieces of the historical transaction record information of the any user, one or more pieces of historical transaction record information with service type information meeting a preset condition.

In some embodiments, the preset condition can comprise multiple pieces of preset historical transaction record information, and one or more pieces of historical transaction record information that meet the preset condition comprise preset service type information in the one or more pieces of historical transaction record information.

For example, the historical transaction record information of the any user is shown in Table 1.

TABLE 1

| User_id | Record_id | Record_biz_type | Other environment information |
|---------|-----------|-----------------|-------------------------------|
| 0001    | 001       | 1               | ...                           |
| 0001    | 002       | 2               | ...                           |
| 0001    | 003       | 3               | ...                           |

In some embodiments, the field "User_id" is the identification information of users, the field "Record_id" is the record identification information of historical transaction record information of the users (in this example, three pieces of historical transaction record information of the user are collected), and the field "Record_biz_type" is the service type information. Here, assuming that the contents "1," "2," and "3" of the field "Record_biz_type" represent that the service type information is "mobile phone credit refill records," "mobile phone records for shipping addresses," and "terminal log-in records" respectively. When the preset service type information is "mobile phone credit refill records" and "mobile phone records for shipping addresses," the historical transaction record information that meets the preset condition includes Row 1 and Row 2 of Table 1.

Step 1203, adding a corresponding relation between the any user and the one or more pieces of historical transaction record information with service type information meeting a preset condition into the storage unit.

As in the example above, adding the corresponding relations between the content "0001" of the field "User_id" and the contents "001" and "002" of the field "Record_id" into the storage unit, respectively.

Step 1204, repeating step 1202 to step 1203 until a corresponding relation between at least one user and one or more pieces of historical transaction record information with service type information meeting a preset condition is added into the storage unit.

In one example, the storage unit may be as shown in Table 2.

TABLE 2

| User_id | Record_id | Record_biz_type | Other environment information |
|---------|-----------|-----------------|-------------------------------|
| 0001    | 001       | 1               | ...                           |
| 0001    | 002       | 2               | ...                           |
| 0002    | 005       | 1               | ...                           |
| 0003    | 009       | 2               | ...                           |

Since there are many users to be accounted for in an actual application and each user has a huge amount of historical transaction record information, the storage unit stores at least one user, one or more pieces of historical transaction record information with service type information meeting a preset condition of at least one user, and a corresponding relation thereof in a structure shown in Table 3 and Table 4 below.

TABLE 3

| User_id | Record_id | Record_mobile | Record_date | Gmt_create | Gmt_modified |
|---------|-----------|---------------|-------------|------------|--------------|
| Identification information | Record identification information | Mobile phone number | Date of a record | Time of creation | Time of update |

TABLE 4

| Record_id | Record_biz_type | Record_ip | Record_mac | Record_device | Record_os |
|-----------|-----------------|-----------|------------|---------------|-----------|
| Record identification information | Service type information | IP address information | MAC address information | Equipment-related information | Operating system information |

| Gmt_create | Gmt_modified |
|------------|--------------|
| Time of creation | Time of update |

For example, according to the identification information of a user, record identification information in the historical transaction record information of the user identified by the identification information can be obtained from Table 3, and then the user's IP address information, MAC address information, equipment-related information, and operating system information can be obtained from Table 4 according to the obtained record identification information.

In some embodiments, the field "Record_mobile" in Table 3 can be varied according to actual situations in different application scenarios. For example, it can be changed to "Record_mail," i.e., an email address, or it can be changed to "Record_address," i.e., a regular mailing address.

Returning to the step 120, and it is assumed that the contents of all fields shown in Table 3 in the storage unit are as shown in Table 5.

TABLE 5

| User_id | Re-cord_id | Re-cord_mobile | Re-cord_date | Gmt_create | Gmt_modified |
|---------|------------|----------------|--------------|------------|--------------|
| 0001 | 001 | 12344001101 | 2015-02-03 00: 00: 00 | 2015-02-04 00: 00: 00 | 2015-02-04 00: 00: 00 |
| 0001 | 002 | 15544667733 | 2015-03-05 00: 00: 00 | 2015-03-06 00: 00: 00 | 2015-03-06 00: 00: 00 |
| 0002 | 005 | 12222227733 | 2015-05-05 00: 00: 00 | 2015-05-06 00: 00: 00 | 2015-05-06 00: 00: 00 |
| 0003 | 009 | 13233457733 | 2015-06-05 00: 00: 00 | 2015-06-06 00: 00: 00 | 2015-06-06 00: 00: 00 |

As in the example above, two pieces of historical transaction record information of a user can be obtained according to the user's identification information "0001," and the record identification information of the two pieces of historical transaction record information are "001" and "002" respectively.

For example, it is assumed that the contents of all fields shown in Table 4 in the two pieces of historical transaction record information with the record identification information "001" and "002" are as shown in Table 6.

TABLE 6

| Record_id | 001 | 002 |
|-----------|-----|-----|
| Record_biz_type | 1 | 2 |
| Record_ip | 192.168.1.6 | 192.168.1.6 |
| Record_mac | 00-01-6C-06-A6-29 | 00-01-6C-06-A6-29 |
| Record_device | IE7.0 | IE8.0 |
| Record_os | IOS7.2 | IOS8.0 |
| Gmt_create | 2015-10-100: 00: 00 | 2015-11-1 00: 00: 00 |
| Gmt_modified | 2015-10-100: 00: 00 | 2015-11-1 00: 00: 00 |

Step 130, determining whether the current environment information of the first user matches the historical environment information in the at least one piece of historical transaction record information.

Optionally, the service request to change a mobile phone number in the example above can further carry a changed mobile phone number.

When the service request to change a mobile phone number carries a changed mobile phone number, the step 130 can further comprise a step of filtering historical environment information, which can reduce the number of matching historical environment information, and then can improve the efficiency of service request identification. The step comprises: filtering out historical environment information that does not comprise the changed mobile phone number from the at least one piece of historical transaction record information, and obtaining the filtered at least one piece of historical transaction record information; determining whether the current environment information of the first user matches the historical environment information in the filtered at least one piece of historical transaction record information.

As in the example above, it is assumed that the changed mobile phone number carried in the service request to change a mobile phone number is "15544667733," then the content of the field "Record_mobile" in the historical transaction record information with record identification information being "001" is not consistent with the changed mobile phone number, i.e., the historical transaction record information with record identification information being "001" does not include the changed mobile phone number. When this piece of historical transaction record information is filtered, the historical transaction record information with record identification information being "002" is obtained. Namely, the current environment information of the first user can be matched with the historical environment information in the historical transaction record information with record identification information being "002."

Returning to the step 130, in one example, the step 130 can comprise:

Step 1301, obtaining historical environment information in one piece of historical transaction record information, sequentially comparing each type of information in the historical environment information with corresponding information in the current environment information, and counting the number of pieces of consistent information according to the comparison.

For example, the historical environment information in the historical transaction record information with record identification information "002" can be obtained. Namely, the contents of the fields "Record_ip," "Record_mac," "Record_device," and "Record_os" for record lines with the field "Record_id" being "002" in Table 6 are obtained respectively, i.e., "192.168.1.6," "00-01-6C-06-A6-29," "IE8.0" and "IOS8.0" are obtained. Subsequently, the four types of information obtained above are compared with corresponding information in the current environment information received in the step 110, i.e., "192.168.1.6," "00-01-6C-06-A6-29," "IE8.0" and "IOS8.0" that have been obtained are compared with "192.168.1.6," "00-01-6C-06-A6-29," "IE7.0" and "IOS8.0" in the current environment information, and the number of those that are consistent are counted. In this example, there are three that are consistent, i.e., only the browser version information is not consistent.

Step 1302, determining a scoring result corresponding to the one piece of historical transaction record information according to the number of pieces of consistent information.

In some embodiments, a scoring rule can be preset, and then a scoring result corresponding to one piece of historical transaction record information can be determined according to the scoring rule. In one example where the environment information comprises four types of information, the above preset scoring rule can be that, if all information is consistent according to comparison (i.e., all four types of information are consistent according to comparison), the scoring result is "9"; if any three types of information are consistent according to comparison, the scoring result is "7"; if any two types of information are consistent according to comparison, the scoring result is "5"; and if any one type of information is consistent according to comparison, the scoring result is "2." A priority may be assigned to each type of information, and the scoring result can be correspondingly increased if information with a high priority is consistent according to comparison. For example, if the IP address information and MAC address information in the environment information are set to have a high priority, the above scoring result can be "6" when these two types of information are consistent according to comparison.

As shown in the example above, when no priority is set, the scoring result corresponding to the historical transaction record information with record identification information being "002" is "7", i.e., the number of pieces of consistent information according to comparison is 3.

Step 1303, repeating step 1301 to step 1302 until a scoring result corresponding to at least one piece of historical transaction record information is determined.

As in the example above, assuming that Table 5 and Table 6 further comprise historical transaction record information with record identification information "003," and the content of the field "Record_mobile" in the historical transaction record information is consistent with the changed mobile phone number, then the historical environment information in the historical transaction record information with record identification information "003" can be obtained, and the obtained four types of information are compared with corresponding information in the current environment information received in the step 110, respectively, to determine a scoring result corresponding to the historical transaction record information with record identification information "003," assuming that the scoring result is "5." Similarly, if there are other pieces of historical transaction record information, scoring results corresponding to other pieces of historical transaction record information are determined.

Step 1304, determining a total result value according to the determined scoring result corresponding to at least one piece of historical transaction record information.

After a scoring result corresponding to each piece of historical transaction record information is determined, the maximum scoring result can be used as a total result value. As in the example above, the scoring result corresponding to the historical transaction record information with record identification information "002" can be used as the total result value. Namely, 7 is used as the total result value. Alternatively, an average or a weighted average of a plurality of scoring results corresponding to a plurality of pieces of historical transaction record information, or a result value according to other algorithms, can be used as a total result value.

Step 1305, determining whether the current environment information of the first user matches the historical environment information in the at least one piece of historical transaction record information according to the total result value.

In some embodiments, a threshold can be preset. If the total result value is greater than the preset threshold, it is determined that the current environment information of the first user matches the historical environment information in the at least one piece of historical transaction record information. Otherwise, it is determined that they do not match. As in the example above, assuming that the preset threshold (which can be adjusted according to actual situations) is 2, the total result value is 7 when the maximum scoring result is used as the total result value. Since 7>2, it can be determined that the current environment information of the first user matches the historical environment information in historical transaction record information with record identification information "002" and "003."

The above step 1301 to step 1305 are merely one implementation manner of the present disclosure. In some embodiments, whether the current environment information of the first user matches historical environment information in the at least one piece of historical transaction record information can also be determined in other manners. For example, a value of similarity degree between the two can be calculated by a similarity algorithm, and then whether the two are matched can be determined according to the value of similarity degree.

Step 140, if the current environment information matches the historical environment information, recognizing the service request as a trusted service request, and executing a service operation to change the mobile phone number.

As in the example above, a service operation to change the mobile phone number can be executed because the two are matched.

In some embodiments, the above step 140 executes the operation when the two are matched; if the two are not matched, whether the service request to change a mobile phone number is a trusted service request can be further determined through interaction with the user. If it is trusted, the service operation to change the mobile phone number can be executed; if not trusted, the service operation to change the mobile phone number is rejected.

With the disclosed method for recognizing a service request to change a mobile phone number, when a service request to change a mobile phone number sent by a user is received, corresponding historical transaction record information is obtained from a storage unit according to user identification information carried in the service request, and current environment information carried in the service request is matched with historical environment information carried in the historical transaction record information. If the current environment information matches the historical environment information, the service request is identified as a trusted service request, and a service operation to change the mobile phone number is executed. As such, the user experience is improved, and the efficiency of recognizing a service request to change a mobile phone number is improved.

How to apply the method for recognizing a service request to change a mobile phone number into a software system (e.g., Alipay system) will be described below.

Figure 3:
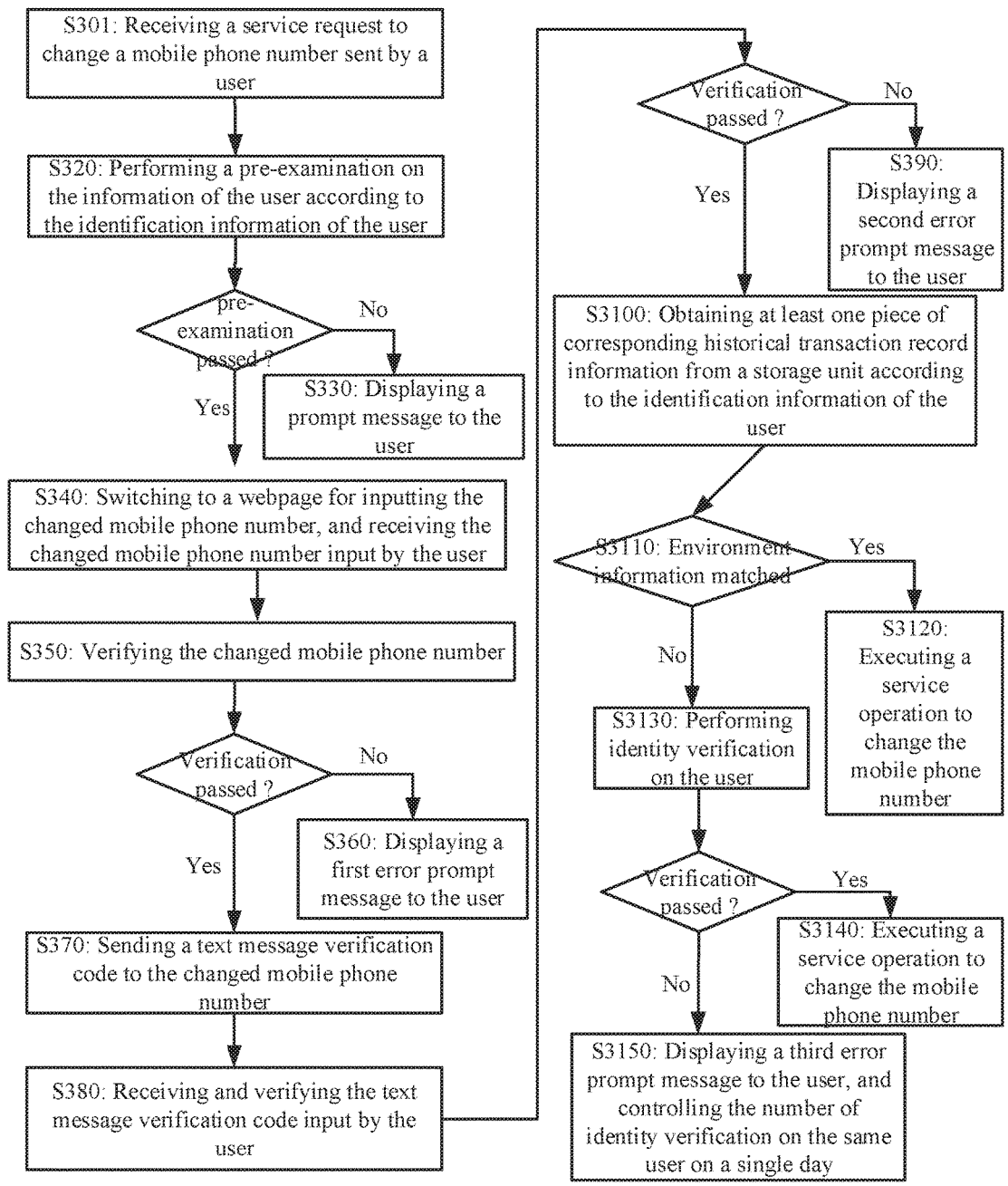
FIG. 3 is a flow chart of processing a request to change a mobile phone number according to some embodiments of the present disclosure.

FIG. 3 is a flow chart of processing a request to change a mobile phone number according to some embodiments of the present disclosure. As shown in FIG. 3, the method can comprise:

Step 310, receiving a service request to change a mobile phone number sent by a user, the service request carrying identification information of the user and current environment information.

In some embodiments, the service request to change a mobile phone number may be sent after the user logs in the software system.

Step 320, performing a pre-examination on the information of the user according to the identification information of the user; if the pre-examination fails, executing the step 330; otherwise, executing the step 340.

In some embodiments, the information of the user can comprise a mobile phone number bundled to the user's software system account; the failure of the pre-examination can be because that the mobile phone number bundled to the user's software system account is not detected.

Step 330, displaying a prompt message to the user.

The prompt message can be used to prompt the user to directly bundle the changed mobile phone number.

Step 340, switching to a webpage for inputting the changed mobile phone number, and receiving the changed mobile phone number input by the user.

Step 350, verifying the changed mobile phone number; if the verification passes, executing the step 360; otherwise, executing the step 370.

In some embodiments, verifying the changed mobile phone number comprises: verifying whether the changed mobile phone number complies with the mobile phone number format (e.g., whether it has 11 digits) and whether the changed mobile phone number has been taken.

Step 360, displaying a first error prompt message to the user, wherein the first error prompt message can be used to instruct the user to re-enter a correct changed mobile phone number.

Step 370, sending a text message verification code to the changed mobile phone number.

Step 380, receiving and verifying the text message verification code input by the user; if the verification fails, executing the step 390; otherwise, executing the step 3100.

Step 390, displaying a second error prompt message to the user, wherein the second error prompt message can be used to instruct the user to re-enter a correct text message verification code.

Step 3100, obtaining at least one piece of corresponding historical transaction record information from a storage unit according to the identification information of the user.

Step 3110, determining whether the current environment information of the first user matches the historical environment information in the at least one piece of historical transaction record information; if the current environment information matches the historical environment information, executing the step 3120; otherwise, executing the step 3130.

Step 3120, executing a service operation to change the mobile phone number.

Namely, no interaction with the user is needed according to the present disclosure when recognizing a service request to change a mobile phone number. Instead, historical transaction record information is obtained from a storage unit, and when current environment information carried in the service request matches historical environment information carried in the historical transaction record information, the service request is identified as a trusted service. As such, the process for changing a mobile phone number can be simplified, and the user experience can be improved.

Step 3130, performing identity verification on the user; if the verification passes, executing the step 3140; otherwise, executing the step 3150.

Step 3140, executing a service operation to change the mobile phone number.

Step 3150, displaying a third error prompt message to the user, and controlling the number of identity verification on the same user on a single day.

In some embodiments, in the process for processing a service request to change a mobile phone number, the software system does not perform identity verification directly on the user when receiving a service request to change a mobile phone number. Instead, the software system matches current environment information of the same user with historical environment information in the pre-collected historical transaction record information. If the matching is successful, a service operation to change the mobile phone number is directly executed; if the matching is not successful, identity verification is then performed on the user. In fact, if it is a trusted service request, the changed mobile phone number would often be reflected in historical environment information of the user. Therefore, the above manner in which a server automatically performs matching can both improve the user experience and improve the efficiency of recognizing a service request to change a mobile phone number.

Figure 4:
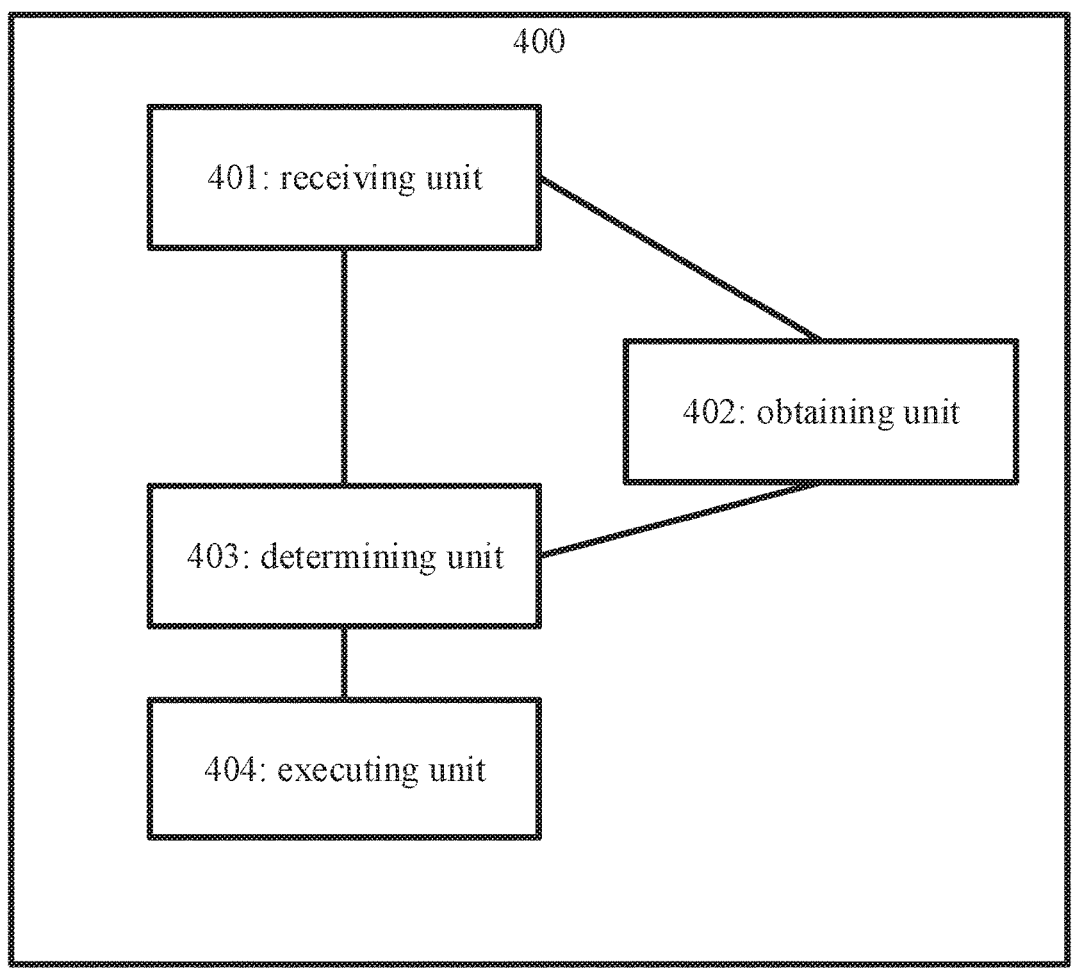
FIG. 4 is a schematic diagram of a device for recognizing a request to change a mobile phone number according to some embodiments of the present disclosure.

Corresponding to the above method for recognizing a service request to change a mobile phone number, embodiments of the present disclosure further provide a device for recognizing a service request to change a mobile phone number. As shown in FIG. 4, the device 400 comprises: a receiving unit 401, an obtaining unit 402, a determining unit 403, and an executing unit 404. The device 400 may be alternatively referred to as a system or an apparatus for recognizing a service request to change a mobile phone number.

The receiving unit 401 is configured to receive a service request to change a mobile phone number sent by a first user, the service request carrying identification information of the first user and current environment information.

In some embodiments, the environment information can comprise one or more types of the following information: IP address information of the user, MAC address information of the user, user equipment-related information, and operating system information of the user.

The obtaining unit 402 is configured to obtain at least one piece of corresponding historical transaction record information from a storage unit according to the identification information of the first user received by the receiving unit 401, wherein the storage unit is configured to record one or more pieces of historical transaction record information of at least one user with service type information meeting a preset condition, and the historical transaction record information comprises historical environment information.

The determining unit 403 is configured to determine whether the current environment information of the first user matches the historical environment information in the at least one piece of historical transaction record information obtained by the obtaining unit 402.

The determining unit 403 is configured, for example, to: obtain historical environment information in one piece of historical transaction record information, sequentially compare each type of information in the historical environment information with corresponding information in the current environment information, and count the number of pieces of consistent information according to the comparison; determine a scoring result corresponding to the one piece of historical transaction record information according to the number of pieces of consistent information; repeatedly execute the above steps of comparison and determining a scoring result, until a scoring result corresponding to at least one piece of historical transaction record information is determined; determine a total result value according to the determined scoring result corresponding to at least one piece of historical transaction record information; determine whether the current environment information of the first user matches the historical environment information in the at least one piece of historical transaction record information according to the total result value.

The executing unit 404 is configured to, if the current environment information matches the historical environment information, identify the service request as a trusted service request, and execute a service operation to change the mobile phone number.

Optionally, the device further comprises: a creating unit 405 configured to collect multiple pieces of historical transaction record information of at least one user in advance, wherein the historical transaction record information comprises service type information; for any of the at least one user, select, from multiple pieces of the historical transaction record information of the any user, one or more pieces of historical transaction record information with service type information meeting a preset condition; add a corresponding relation between the any user and the one or more pieces of historical transaction record information with service type information meeting a preset condition into the storage unit; repeat the above steps of selecting and adding, until a corresponding relation between at least one user and one or more pieces of historical transaction record information with service type information meeting a preset condition is added into the storage unit.

Optionally, the service request to change a mobile phone number can further carry a changed mobile phone number.

The determining unit 403 is further configured, for example, to: filter out historical environment information that does not comprise the changed mobile phone number from the at least one piece of historical transaction record information, and obtain filtered at least one piece of historical transaction record information; determine whether the current environment information of the first user matches the historical environment information in the filtered at least one piece of historical transaction record information.

The various modules and units of the device 400 may be implemented as software instructions. That is, the device 400 may comprise a processor and a non-transitory computer-readable storage medium storing instructions that, when executed by the processor, cause the device 400 to perform various steps and methods of the modules and units described above. In some embodiments, the device 400 may include a mobile phone, a tablet computer, a PC, a laptop computer, a server, etc.

Functions of the various functional modules of the device in the embodiment of the present disclosure can be implemented through the steps of the above method embodiments. Therefore, the specific working process of the device according to the present disclosure will not be repeated herein.

With the disclosed device for recognizing a service request to change a mobile phone number, the receiving unit 401 receives a service request to change a mobile phone number sent by a first user, the service request carrying identification information of the first user and current environment information. The obtaining unit 402 obtains at least one piece of corresponding historical transaction record information from a storage unit according to the identification information of the first user, wherein the storage unit is configured to record one or more pieces of historical transaction record information of at least one user with service type information meeting a preset condition, and the historical transaction record information comprises historical environment information. The determining unit 403 determines whether the current environment information of the first user matches the historical environment information in the at least one piece of historical transaction record information. The executing unit 404 identifies, if the current environment information matches the historical environment information, the service request as a trusted service request, and executes a service operation to change the mobile phone number. As such, the user experience is improved, and the efficiency of recognizing a service request to change a mobile phone number is improved.

A person skilled in the art should further understand that the objects and algorithm steps in all examples described with reference to the embodiments disclosed herein can be implemented by electronic hardware, computer software, or a combination of the two. To clearly describe the interchangeability between hardware and software, compositions and steps of various examples have been described according to the functions in the description above. Whether these functions are executed in a hardware manner or a software manner is dependent on particular applications and design restriction conditions of the technical solutions. A person skilled in the art can implement the described functions using a different method for each particular application; however, such implementations shall not be construed to be beyond the scope of the present disclosure.

Steps of the method or algorithm described with reference to the embodiments disclosed herein can be implemented by hardware, software modules executed by a processor, or a combination of the two. The software modules can be placed in a Read-Only Memory (ROM), an Electrically Programmable Read-Only Memory (EPROM), an Electrically Erasable Programmable Read-Only Memory (EEPROM), a register, a hard drive, a mobile magnetic disk, a CD-ROM, or a storage medium in any other form.

The disclosure above further describes the objects, technical solutions, and advantageous effects in detail. The description above is merely exemplary and is not used to limit the scope of the present disclosure. Any modification, equivalent substitution, and improvement made within the spirit and principle of the present disclosure shall fall within the scope of the present disclosure.

What is claimed is:

1. A method for recognizing a request to change a mobile phone number, comprising:
   receiving a request to change a mobile phone number sent by a first user, the request carrying identification information of the first user and current environment information;
   obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information;
   determining whether the current environment information of the first user matches the historical environment information in the at least one piece of historical transaction record information; and
   if the current environment information matches the historical environment information, recognizing the request as a trusted request, and executing a service operation to change the mobile phone number.

2. The method according to claim 1, wherein:
   the request to change a mobile phone number further comprises a changed mobile phone number; and
   the determining whether the current environment information of the first user matches the historical environment information in the at least one piece of historical transaction record information comprises:
   filtering out historical environment information that does not comprise the changed mobile phone number from the at least one piece of historical transaction record information, and obtaining the filtered at least one piece of historical transaction record information; and
   determining whether the current environment information of the first user matches the historical environment information in the filtered at least one piece of historical transaction record information.

3. The method according to claim 1, wherein the storage unit is created by:
   collecting multiple pieces of the historical transaction record information of the at least one user, wherein the historical transaction record information comprises service type information;
   for any of the at least one user, selecting, from multiple pieces of the historical transaction record information of the any user, one or more pieces of historical transaction record information with service type information meeting a preset condition;

adding a corresponding relation between the any user and the one or more pieces of historical transaction record information with service type information meeting a preset condition into the storage unit; and repeating the above steps of selecting and adding, until a corresponding relation between the at least one user and the one or more pieces of historical transaction record information with service type information meeting the preset condition is added into the storage unit.

4. The method according to claim 1, wherein the environment information comprises one or more types of the following information:

Internet Protocol (IP) address information of the user, Medium Access Control (MAC) address information of the user, user equipment-related information, and operating system information of the user.

5. The method according to claim 4, wherein:

the user equipment comprises a fixed terminal; and the user equipment-related information comprises one or more of the following: browser type information, browser version information, and MAC address identifier information (umid).

6. The method according to claim 4, wherein:

the user equipment comprises a mobile terminal; and the user equipment-related information comprises one or more of the following:

International Mobile Equipment Identification Number (IMEI) information and International Mobile Subscriber Identification Number (IMSI) information.

7. The method according to claim 4, wherein the determining whether the current environment information of the first user matches the historical environment information in the at least one piece of historical transaction record information comprises:

obtaining the historical environment information in one piece of the historical transaction record information, sequentially comparing each type of information in the historical environment information with corresponding information in the current environment information, and counting a number of pieces of consistent information according to the comparison;

determining a scoring result corresponding to the one piece of historical transaction record information according to the number of pieces of consistent information;

repeatedly executing the above steps of comparison and determining the scoring result, until a scoring result corresponding to the at least one piece of historical transaction record information is determined;

determining a total result value according to the determined scoring result corresponding to the at least one piece of historical transaction record information; and determining whether the current environment information of the first user matches the historical environment information in the at least one piece of historical transaction record information according to the total result value.

8. A non-transitory computer-readable storage medium storing instructions that, when executed by a processor, cause the processor to perform a method for recognizing a request to change a mobile phone number, the method comprising:

receiving a request to change a mobile phone number sent by a first user, the request carrying identification information of the first user and current environment information;

obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information;

determining whether the current environment information of the first user matches the historical environment information in the at least one piece of historical transaction record information; and if the current environment information matches the historical environment information, recognizing the request as a trusted request, and executing a service operation to change the mobile phone number.

9. The non-transitory computer-readable storage medium according to claim 8, wherein:

the request to change a mobile phone number further comprises a changed mobile phone number; and the determining whether the current environment information of the first user matches the historical environment information in the at least one piece of historical transaction record information comprises:

filtering out historical environment information that does not comprise the changed mobile phone number from the at least one piece of historical transaction record information, and obtaining the filtered at least one piece of historical transaction record information; and determining whether the current environment information of the first user matches the historical environment information in the filtered at least one piece of historical transaction record information.

10. The non-transitory computer-readable storage medium according to claim 8, wherein the storage unit is created by:

collecting multiple pieces of the historical transaction record information of the at least one user, wherein the historical transaction record information comprises service type information;

for any of the at least one user, selecting, from multiple pieces of the historical transaction record information of the any user, one or more pieces of historical transaction record information with service type information meeting a preset condition;

adding a corresponding relation between the any user and the one or more pieces of historical transaction record information with service type information meeting a preset condition into the storage unit; and repeating the above steps of selecting and adding, until a corresponding relation between the at least one user and the one or more pieces of historical transaction record information with service type information meeting the preset condition is added into the storage unit.

11. The non-transitory computer-readable storage medium according to claim 8, wherein the environment information comprises one or more types of the following information:

Internet Protocol (IP) address information of the user, Medium Access Control (MAC) address information of the user, user equipment-related information, and operating system information of the user.

12. The non-transitory computer-readable storage medium according to claim 11, wherein:
the user equipment comprises a fixed terminal; and
the user equipment-related information comprises one or more of the following: browser type information, browser version information, and MAC address identifier information (umid).

13. The non-transitory computer-readable storage medium according to claim 11, wherein:
the user equipment comprises a mobile terminal; and
the user equipment-related information comprises one or more of the following: International Mobile Equipment Identification Number (IMEI) information and International Mobile Subscriber Identification Number (IMSI) information.

14. The non-transitory computer-readable storage medium according to claim 11, wherein the determining whether the current environment information of the first user matches the historical environment information in the at least one piece of historical transaction record information comprises:
obtaining the historical environment information in one piece of the historical transaction record information, sequentially comparing each type of information in the historical environment information with corresponding information in the current environment information, and counting a number of pieces of consistent information according to the comparison;
determining a scoring result corresponding to the one piece of historical transaction record information according to the number of pieces of consistent information;
repeatedly executing the above steps of comparison and determining the scoring result, until a scoring result corresponding to the at least one piece of historical transaction record information is determined;
determining a total result value according to the determined scoring result corresponding to the at least one piece of historical transaction record information; and
determining whether the current environment information of the first user matches the historical environment information in the at least one piece of historical transaction record information according to the total result value.

15. A system for recognizing a request to change a mobile phone number, the system comprising a processor and a non-transitory computer-readable storage medium storing instructions that, when executed by the processor, cause the system to perform a method for recognizing a request to change a mobile phone number, the method comprising:
receiving a request to change a mobile phone number sent by a first user, the request carrying identification information of the first user and current environment information;
obtaining at least one piece of corresponding historical transaction record information from a storage unit according to the identification information of the first user, wherein the storage unit is configured to record one or more pieces of the historical transaction record information of at least one user with service type information meeting a preset condition, and the historical transaction record information comprises historical environment information;
determining whether the current environment information of the first user matches the historical environment information in the at least one piece of historical transaction record information; and
if the current environment information matches the historical environment information, recognizing the request as a trusted request, and executing a service operation to change the mobile phone number.

16. The system according to claim 15, wherein:
the request to change a mobile phone number further comprises a changed mobile phone number; and
the determining whether the current environment information of the first user matches the historical environment information in the at least one piece of historical transaction record information comprises:
filtering out historical environment information that does not comprise the changed mobile phone number from the at least one piece of historical transaction record information, and obtaining the filtered at least one piece of historical transaction record information; and
determining whether the current environment information of the first user matches the historical environment information in the filtered at least one piece of historical transaction record information.

17. The system according to claim 15, wherein the storage unit is created by:
collecting multiple pieces of the historical transaction record information of the at least one user, wherein the historical transaction record information comprises service type information;
for any of the at least one user, selecting, from multiple pieces of the historical transaction record information of the any user, one or more pieces of historical transaction record information with service type information meeting a preset condition;
adding a corresponding relation between the any user and the one or more pieces of historical transaction record information with service type information meeting a preset condition into the storage unit; and
repeating the above steps of selecting and adding, until a corresponding relation between the at least one user and the one or more pieces of historical transaction record information with service type information meeting the preset condition is added into the storage unit.

18. The system according to claim 15, wherein the environment information comprises one or more types of the following information:
Internet Protocol (IP) address information of the user, Medium Access Control (MAC) address information of the user, user equipment-related information, and operating system information of the user.

19. The system according to claim 18, wherein:
the user equipment comprises a mobile terminal; and
the user equipment-related information comprises one or more of the following: International Mobile Equipment Identification Number (IMEI) information and International Mobile Subscriber Identification Number (IMSI) information.

20. The system according to claim 15, wherein the determining whether the current environment information of the first user matches the historical environment information in the at least one piece of historical transaction record information comprises:
obtaining the historical environment information in one piece of the historical transaction record information, sequentially comparing each type of information in the historical environment information with corresponding information in the current environment information, and counting a number of pieces of consistent information according to the comparison;
determining a scoring result corresponding to the one piece of historical transaction record information according to the number of pieces of consistent information;
repeatedly executing the above steps of comparison and determining the scoring result, until a scoring result corresponding to the at least one piece of historical transaction record information is determined;
determining a total result value according to the determined scoring result corresponding to the at least one piece of historical transaction record information; and
determining whether the current environment information of the first user matches the historical environment information in the at least one piece of historical transaction record information according to the total result value.

\* \* \* \* \*